United States Patent
Pean et al.

(10) Patent No.: US 6,231,769 B1
(45) Date of Patent: May 15, 2001

(54) INSTALLATION FOR PRODUCING OZONIZED WATER

(75) Inventors: Jean-Louis Pean, Montlhery; Boris Gammal, Meudon, both of (FR)

(73) Assignee: l'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/423,295

(22) PCT Filed: Apr. 24, 1998

(86) PCT No.: PCT/FR98/00823

§ 371 Date: Nov. 9, 1999

§ 102(e) Date: Nov. 9, 1999

(87) PCT Pub. No.: WO98/57896

PCT Pub. Date: Dec. 23, 1998

(30) Foreign Application Priority Data

Jun. 17, 1997 (FR) .................................................. 97 07506

(51) Int. Cl.⁷ ........................................................ C02F 1/78
(52) U.S. Cl. .......................... 210/760; 210/765; 210/167; 210/192; 210/194; 210/205; 210/539
(58) Field of Search .................................. 210/758, 760, 210/765, 167, 192, 194, 198.1, 205, 539

(56) References Cited

U.S. PATENT DOCUMENTS

| | | | |
|---|---|---|---|
| 4,767,528 | * | 8/1988 | Sasaki et al. ........................ 210/192 |
| 4,898,679 | * | 2/1990 | Siegel et al. ......................... 210/760 |
| 5,174,905 | | 12/1992 | Shaw . |
| 5,376,265 | * | 12/1994 | Szabo .................................. 210/192 |
| 5,578,280 | * | 11/1996 | Kazi et al. ....................... 422/186.07 |
| 5,824,243 | * | 10/1998 | Contreras ............................. 210/192 |
| 5,843,307 | * | 12/1998 | Faivre et al. ........................ 210/192 |
| 5,868,945 | * | 2/1999 | Morrow et al. ...................... 210/760 |

FOREIGN PATENT DOCUMENTS

| | | |
|---|---|---|
| 0 577 475 A1 | 1/1994 | (EP) . |
| 2 577 209 | 8/1986 | (FR) . |
| 03 217294 | 9/1991 | (JP) . |

* cited by examiner

*Primary Examiner*—David A. Simmons
*Assistant Examiner*—Betsey Morrison Hoey
(74) *Attorney, Agent, or Firm*—Burns, Doane, Swecker & Mathis, L.L.P.

(57) ABSTRACT

An installation for producing ozonized water, comprising a circuit for producing ozonized water comprising a circuit for producing ozonized water comprising a water inlet, an ozone-injection inlet for injecting ozone taken from an ozone source, a contactor for bringing the ozone into contact with the water, a section for utilizing the ozonized water arranged downstream of the contactor, and an undissolved ozone collector, downstream of the contactor, comprising an outlet connected to the circuit for producing ozonized water upstream of the contactor.

19 Claims, 1 Drawing Sheet

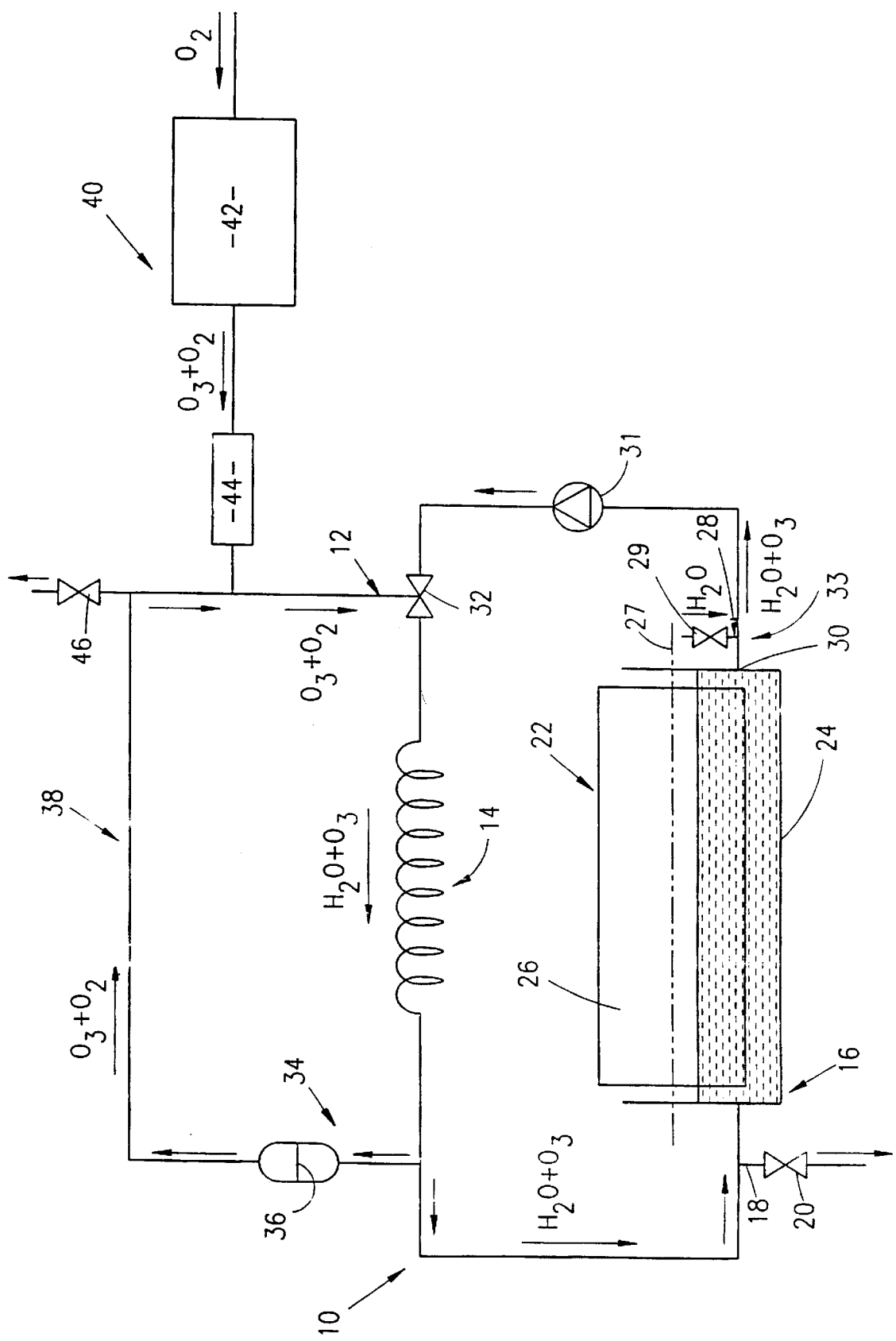

INSTALLATION FOR PRODUCING OZONIZED WATER

BACKGROUND OF THE INVENTION (i) Field of the Invention

The present invention relates to an installation for producing ozonized water, of the type comprising a circuit for producing ozonized water comprising a water inlet, an ozone-injection inlet for injecting ozone taken from an ozone source, a contactor for bringing the ozone into contact with the water, and a section for utilizing the ozonized water arranged downstream of the contactor.

Such installations are used, in particular, in order to produce ozonized water for washing fish or shellfish.

(ii) Description of the Related Art

In known installations, the contactors comprise a water-filled vessel in which ozone is bubbled in order to dilute some of the ozone gas in the water.

However, only a small proportion of the ozone passing through the water is actually dissolved, so that a large part of the ozone passes through the volume of water then escapes through an opening made in the upper part of the vessel. The residual ozone is thus discharged by releasing it to the atmosphere.

In order to avoid the pollution due to such releases of ozone, a filter comprising oxidizing agents is often provided at the discharge outlet for the ozone in order to convert the latter into oxygen before it is released.

Because of the large amount of ozone released into the atmosphere, and the frequent need to treat it, such installations have a high running cost.

SUMMARY AND OBJECTS OF THE INVENTION

The object of the invention is to provide an installation for producing ozonized water whose running cost is reduced and which minimizes the losses of ozone into the atmosphere.

To that end, the invention relates to an installation for producing ozonized water of the aforementioned type, characterized in that it comprises means for collecting undissolved ozone, arranged downstream of the contactor, and in that the outlet of the collection means is connected to the circuit for producing ozonized water upstream of the contactor.

According to particular embodiments, the installation may comprise one or more of the following characteristics:

it comprises means for joining the outlet of the collection means to the outlet of the ozone source upstream of the ozone-injection inlet provided on the circuit for producing ozonized water;

the ozone-injection inlet comprises a water pump for injecting ozone gas into the water circulating in the circuit for producing ozonized water;

it comprises a mass-flow regulator at the outlet of the ozone source;

the collection means comprise a settling compartment;

it comprises, downstream of the means for collecting the undissolved ozone, a calibrated vent which discharges a determined amount of the gas collected;

the contactor comprises a coil;

the circuit for producing the ozonized water is closed in a loop, and the section for utilizing the ozonized water comprises an ozonized-water circulation outlet, which outlet is connected to the water inlet of the circuit for producing ozonized water;

the ozonized-water circulation loop comprises a circulating pump;

the said section for utilizing the ozonized water comprises a tap for drawing off ozonized water; and the section for utilizing the ozonized water comprises a machine for producing ozonized ice, comprising a water compartment for manufacturing ice, and the compartment is connected in series with the ozonized-water circulation loop.

The invention will be understood more clearly on reading the following description which is given solely by way of example and with reference to the single figure.

DETAILED DESCRIPTION OF THE DRAWINGS

FIG. 1 is a schematic view of an installation for producing ozonized water according to the invention.

DETAILED DESCRIPTION OF PREFERRED EMBODIMENTS

The installation for producing ozonized water which is represented in FIG. 1 principally comprises a circuit 10 for producing ozonized water. This circuit comprises an ozone-injection inlet 12, a contactor 14 for bringing the ozone into contact with the water circulating in the production circuit, and a section 16 for utilizing the ozonized water.

The utilization section 16 comprises a tap for drawing off ozonized water 18 which is formed by a take-off provided with a valve 20. It furthermore comprises, connected in series, a machine for producing ozonized ice 22. The latter comprises an ozonized-water compartment 24 connected in series with the circuit 10 for producing ozonized water. It furthermore comprises, in a manner which is known per se, a rotary refrigerating cylinder 26 arranged horizontally mobile about its horizontal axis 27. The lower part of the rotary cylinder 26 is immersed in the ozonized water contained in the compartment 24. The level of the water in the compartment 24 is kept constant by adding water from an external water inlet, denoted 28. The latter is provided with a valve 29, the opening of which is controlled by a float carried on the surface of the water in the compartment 24.

The compartment 24 comprises a circulation outlet 30 for the ozonized water not converted into ice. This outlet 30 is connected via a pump 31 to a water pump 32 with which the ozone-injection inlet 12 is integrated.

The circuit 10 for producing ozonized water is thus closed in a loop. It forms a loop, denoted 33, which successively comprises the contactor 14, the drawing-off tap 20, the machine for producing ice 22, the pump 31 and the water pump 32 incorporating the ozone-injection inlet 12. The inlet for admitting water into the circuit 10 for producing ozonized water is formed by the inlet 28 located immediately downstream of the compartment 24.

The contactor 14 forming means of bringing the ozone into contact with the water circulating in the circuit for producing ozonized water is formed, for example, by a coil.

The water pump 32, or Venturi device, forms a hydro-ejector capable of introducing, into the liquid flow circulating in the circuit 10, calibrated-diameter bubbles of ozone taken from the ozone-injection inlet 12.

According to the invention, means 34 for collecting the ozone not dissolved in the coil are provided downstream of the coil 14. These means are for example formed by a settling compartment 36 suitable for separating the undissolved gas, and in particular the undissolved ozone from the ozonized water circulating in the production circuit 10.

The outlet for discharging the residual ozone (undissolved ozone) is connected to the inlet of the ozone injector 12.

The settling compartment 36 is thus integrated in a recycling loop which is denoted by the overall reference 38 and comprises a section in common with the loop 33 for circulating the ozonized water. This common section consists of the water pump 32 and the coil 14.

Furthermore, an ozone-supply source 40 is connected to the recycling circuit 38 upstream of the ozone-injection inlet 12.

This ozone-supply source comprises an ozonizer 42 supplied with impure oxygen formed, for example, by liquefying air. The gas produced at the outlet of the ozonizer comprises about 10% ozone and 90% oxygen. A mass-flow regulator 44 is installed at the outlet of the ozonizer.

The recycling loop 38 comprises a calibrated vent 46 arranged upstream of the ozone-supply means 40. This orifice is designed to discharge a determined quantity of the gas circulating in the recycling loop 38. It is intended, in particular, to discharge the nitrogen and argon originating from the impurities contained in the oxygen feeding the ozonizer 42.

The installation described here functions in the following way. The water contained in the compartment 24 of the machine for producing ozonized ice circulates continuously in the loop 33 for producing ozonized water, under the action of the pump 31. The ozone taken from the ozone-injection inlet 12 is brought into contact with the ozonized water circulating in the main loop 33. A fraction of the ozone gas dissolves in the water circulating in the circuit 10 when the ozone and the water circulate along the length of the coil 14. The undissolved residual ozone is collected by the settling compartment 36 at the outlet of the coil 14 and sent to the water pump 32. In practice, about 80% of the ozone introduced upstream of the coil 14 is recycled in this way.

When the residual ozone circulates in the recycling loop 38, a fraction of the gas circulating is discharged into the atmosphere through the calibrated vent 36 in order to limit the concentration of nitrogen and argon in the gas circulating in this loop.

Furthermore, the ozone-supply means 40 inject, into the recycling loop 38, a quantity of ozone corresponding substantially to the quantity of ozone dissolved in the water and the quantity of gas escaping through the vent 36.

It can thus be seen that, during its circulation in the main loop 33, the water progressively accumulates dissolved ozone. In particular, the flow rate in the circuit 10 is fixed so that the flow rate circulating is between three and eighteen times the rate of ozonized water consumed in the utilization section formed by the drawing-off tap 20 in the machine for producing ice 22.

The level of water in the compartment 24 is kept constant using the valve 28 controlled by the float for detecting the level of liquid in the compartment.

As a variant (not shown), the machine for producing ice 24 may comprise a covering lid preventing any evaporation of ozone gas.

In the absence of such hermetic lids, a hood for extracting the vaporized ozone is provided above the machine 22.

Furthermore, it is possible to recycle the gas escaping through the calibrated vent 46 to the inlet of the ozonizer 42. To that end, this gas is dried in order to reduce the quantity of water contained in it before it is introduced into the ozonizer.

It can be seen that, with such a plant, the losses of ozone are very small. Thus, the quantity of ozone needed for producing a determined quantity of ice is relatively small compared with the ozone used in an installation which does not have such means for recycling the ozone.

The machine for producing ice which is employed in the described installation is a horizontal-axis machine. However, a vertical-axis machine may also be used. In this case, the ozonized water circulating in the circuit flows downwards along the cylindrical walls of a refrigerated cylinder rotating about its vertical axis. A scraper takes off the ice along the cylinder.

What is claimed is:

1. An installation for producing ozonized water comprising:
   a circuit for producing ozonized water comprising:
   (a) a water inlet,
   (b) an ozone-injection inlet for injecting ozone taken from an ozone source, wherein said ozone-injection inlet comprises a water pump for injecting ozone gas into the water circulating in the circuit for producing ozonized water,
   (c) a contactor for bringing the ozone into contact with the water,
   (d) a section for utilizing the ozonized water arranged downstream of the contactor,
   an undissolved ozone collector, downstream of the contactor, comprising an outlet connected to said circuit for producing ozonized water upstream of the contactor.

2. The installation according to claim 1, further comprising a conduit joining an outlet of the collector to the outlet of the ozone source upstream of the ozone-injection inlet provided on the circuit for producing ozonized water.

3. The installation according to claim 1, further comprising a mass-flow regulator at the outlet of the ozone source.

4. The installation according to claim 1, wherein said collector comprises a settling compartment.

5. The installation according to claim 1, further comprising, downstream of the collector, a calibrated vent which discharges a determined amount of the gas collected.

6. The installation according to claim 1, wherein said contactor comprises a coil.

7. The installation according to claim 1, wherein said circuit for producing the ozonized water is closed in a loop and wherein said section for utilizing the ozonized water comprises an ozonized-water circulation outlet connected to said water inlet of the circuit for producing ozonized water.

8. The installation according to claim 7, wherein said ozonized-water circulation loop comprises a circulating pump.

9. The installation according to claim 8, wherein said section for utilizing the ozonized water comprises a tap for drawing off ozonized water.

10. The installation according to claim 7, wherein said section for utilizing the ozonized water comprises a tap for drawing off ozonized water.

11. The installation according to claim 7, wherein said section for utilizing the ozonized water comprises a machine for producing ozonized ice, comprising a water compartment for manufacturing ice connected in series in said ozonized-water circulation loop.

12. A method for producing ozonized water comprising the steps of:
   (a) circulating ozonized water in a loop comprising a water inlet, an ozone-injection inlet for injecting ozone taken from an ozone source, a contactor for bringing the ozone into contact with the water and a section for utilizing the ozonized water arranged downstream of the contactor, (b) injecting ozone from the ozone injecting inlet into the water circulating in said loop, (c) dissolving a quantity of the ozone into the water by circulating the water through the contactor;

(d) removing a gas including undissolved residual ozone from said loop;

(e) discharging a fraction of the gas; and recycling the undissolved residual ozone back into said loop.

13. The method according to claim 12, wherein said step (b) of injecting ozone into water injects a quantity of ozone corresponding substantially to the quantity of ozone dissolved in the water and the fraction of gas discharged in said step (e).

14. The method according to claim 12, further comprising the step of recycling the gas discharged in said step (e) to said ozone source.

15. A method for producing ozonized water comprising the steps of:

(a) circulating ozonized water in a loop comprising a water inlet, an ozone-injection inlet for injecting ozone taken from an ozone source, a contactor for bringing the ozone into contact with the water and a section for utilizing the ozonized water arranged downstream of the contactor, (b) injecting ozone from the ozone injecting inlet into the water circulating in said loop, (c) dissolving a quantity of the ozone into the water by circulating the water through the contactor;

(d) removing a gas including undissolved residual ozone from said loop;

(e) recycling the undissolved residual ozone back into said loop; and (f) consuming said ozonized water in said section for utilizing ozonized water at a rate such that the water circulated in step (a) is between three and eighteen times the rate at which the ozonized water is consumed.

16. The method according to claim 15, wherein said step of consuming said ozonized water comprises converting said ozonized water into ozonized ice.

17. An installation for producing ozonized water comprising:

a circuit for producing ozonized water comprising:
(a) a water inlet,
(b) an ozone-injection inlet for injecting ozone taken from an ozone source,
(c) a contactor for bringing the ozone into contact with the water,
(d) a section for utilizing the ozonized water arranged downstream of the contactor, an undissolved ozone collector, downstream of the contactor, comprising an outlet connected to said circuit for producing ozonized water upstream of the contactor, a mass-flow regulator at the outlet of the ozone source.

18. An installation for producing ozonized water comprising:

a circuit for producing ozonized water comprising:
(a) a water inlet,
(b) an ozone-injection inlet for injecting ozone taken from an ozone source,
(c) a contactor for bringing the ozone into contact with the water,
(d) a section for utilizing the ozonized water arranged downstream of the contactor, an undissolved ozone collector, downstream of the contactor, comprising an outlet connected to said circuit for producing ozonized water upstream of the contactor and further comprising a settling compartment.

19. An installation for producing ozonized water comprising:

a circuit for producing ozonized water comprising:
(a) a water inlet,
(b) an ozone-injection inlet for injecting ozone taken from an ozone source,
(c) a contactor for bringing the ozone into contact with the water,
(d) a section for utilizing the ozonized water arranged downstream of the contactor, an undissolved ozone collector, downstream of the contactor, comprising an outlet connected to said circuit for producing ozonized water upstream of the contactor, a calibrated vent downstream of the collector which discharges a determined amount of the gas collected.

* * * * *